Feb. 20, 1951 S. L. GILLESPIE 2,542,765
ADJUSTABLE SPEED FLUID ACTUATED SERVOMOTOR
Original Filed May 3, 1945
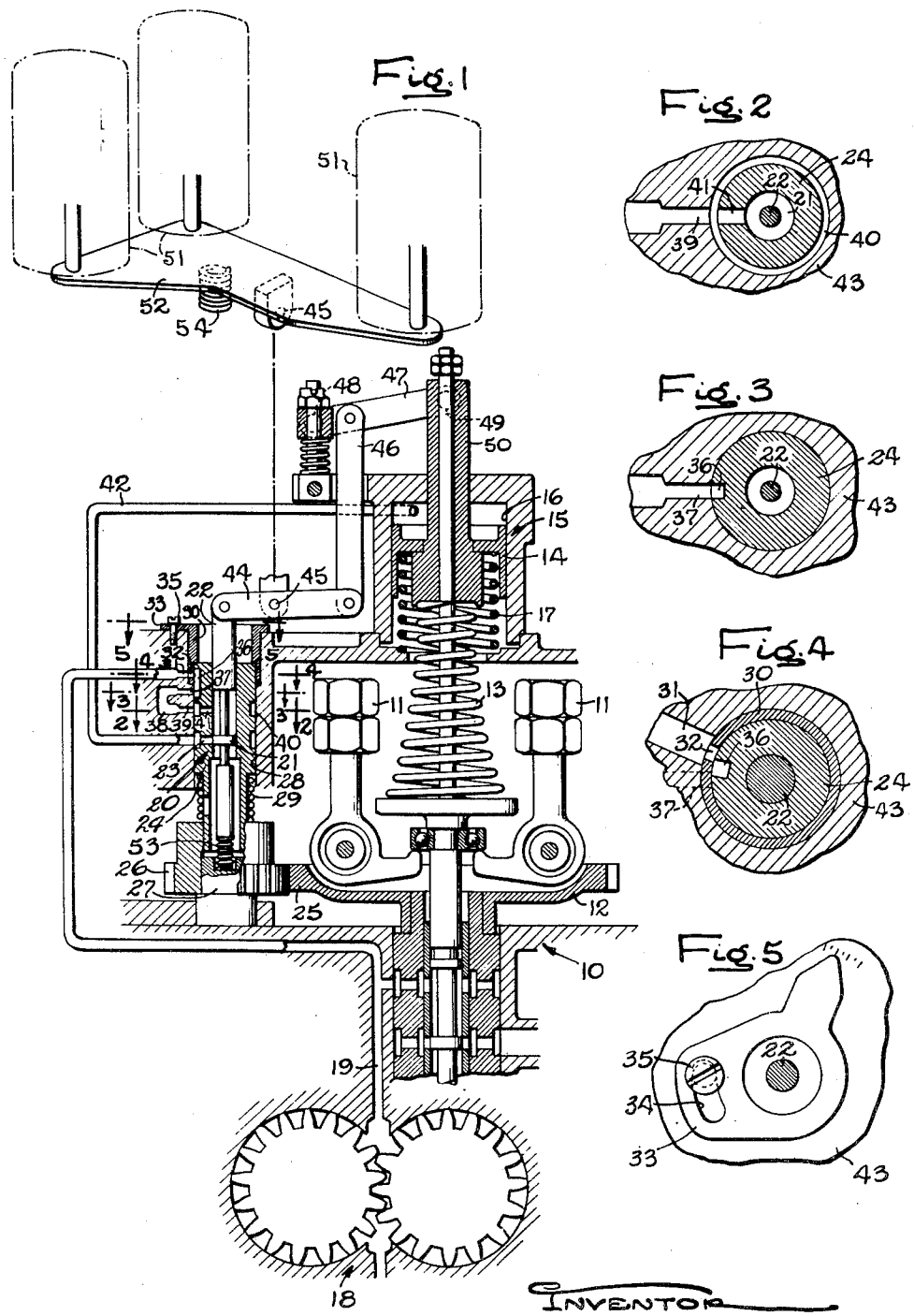
INVENTOR
Sidney Lockwood Gillespie
By Carlson, Pitzner, Hubbard & Wolfe
ATTORNEYS Patented Feb. 20, 1951

2,542,765

UNITED STATES PATENT OFFICE 2,542,765

ADJUSTABLE SPEED FLUID ACTUATED SERVOMOTOR

Sidney Lockwood Gillespie, Rockford, Ill., assignor to Woodward Governor Company, Rockford, Ill., a corporation of Illinois Original application May 3, 1945, Serial No. 591,809, now Patent No. 2,496,284, dated February 7, 1950. Divided and this application November 1, 1946, Serial No. 707,225

5 Claims. (Cl. 121—41)

This invention relates to hydraulic servos and more particularly to the manner of controlling the flow of pressure fluid thereto to regulate the rate of change of position of the element actuated by the servo.

One object is to interpose in the fluid supply line leading to the servo a novel means for passing pressure fluid intermittently.

The invention also resides in the novel structural character of the intermittently acting means and to the manner of its adjustment for different average rates of fluid flow.

Other objects and advantages of the invention will become apparent from the following detailed description taken in connection with the accompanying drawings, in which Figure 1 is a schematic cross-sectional and hydraulic circuit diagram of a fluid servo embodying the novel features of the present invention.

Figs. 2, 3, 4, and 5 are fragmentary sectional views taken respectively along the lines 2—2, 3—3, 4—4, and 5—5 of Fig. 1.

In the drawings, the invention is shown for purposes of illustration embodied in a servo actuator for effecting speed adjustment of a governor 10. The latter includes flyballs 11 pivoted on a ball head 12 which is rotated in unison with the governed prime mover. Centrifugal force on the flyballs is balanced against the stress of a compression type speeder spring 13 which is adjusted for different speed settings by movement of an abutment 14. Herein, this abutment or speed adjusting element constitutes the piston of an hydraulic actuator 15 including a cylinder 16 in which the piston reciprocates. The piston is urged upwardly by a compression spring 17 and is moved downwardly by the admission of pressure fluid to the cylinder 16 from a suitable source which may comprise a pump 18 driven in unison with the governor 10 and associated with a suitable by-pass valve (not shown) to maintain the pressure in the pump outlet 19 substantially constant.

The flow of fluid to the servo actuator 15 is through a passage 42 to which fluid is supplied under the control of a valve 20 comprising a land 21 on a reciprocable stem 22 and a cooperating port 23 in a sleeve 24. The latter is continuously rotated from the ball head 12 through a gear 25 meshing with a gear 26 fast on the lower end of the sleeve and journaled on a stud 27. The upper end portion of the sleeve 24 is journaled in a bore 28 in the governor casing 43 and in a counterbored portion of a bushing 30 having a shoulder against which the sleeve 24 is urged by a spring 29. Angular adjustment of the bushing is permitted by a slot 34 formed in a flange 33 of the bushing and receiving a screw 35 by which the bushing may be clamped in adjusted position.

The fluid supply line 19 leads to the interior of the sleeve 24 through a passage 31 which registers continuously with a hole 32 in the bushing 30. Once during each revolution of the sleeve 24, a longitudinally elongated slot 36 in the exterior of the sleeve 24 is brought into registry with the hole 32. During a part of such registration, the slot 36 also registers with a port 37 which is angularly spaced from the passage 31 and the port 32 as shown in Fig. 4. The port 37 communicates through a passage 38 and a port 39 with an annular groove 40 around the sleeve 24. A hole 41 leads from this groove to the interior of the sleeve 24 above the valve land 21.

It will thus be seen that fluid from the supply line will flow to the valve chamber during that portion of each revolution of the sleeve in which the sleeve slot 36 is in registry with both the bushing hole 32 and the port 37 as shown in Fig. 4. By adjusting the bushing 30 angularly, the amount of such simultaneous registration may be increased or decreased as desired thereby varying the average rate of fluid flow through the central valve 20 when the latter is open. Very slow rates of flow may thus be obtained even though the fluid passages are of relatively large size and not subject to clogging.

The stem 22 of the valve 20 projects from the upper end of the sleeve 24 and is pivotally connected to one end of a lever 44 fulcrumed on a floating pin 45 and urged upwardly by springs 53 and 54 and connected at its other end to a link 46. The upper end of the latter is pivotally connected intermediate the ends of a lever 47 fulcrumed at 48 and pivotally connected at 49 to the outer end of a rod 50 on the servo actuator piston 14. Herein, the position of the fulcrum 45 is changed selectively according to the desired adjustment of the piston 14 by energizing a plurality of solenoids 51 in different combinations. The armatures of these bear at spaced points against a plate 52 constituting a differential lever and carrying the fulcrum 45 intermediate these points. The spring 54 bears upwardly on the plate 52 to hold the latter against the solenoid armatures.

When the system is in equilibrium, the parts will be positioned as shown in Fig. 1, the servo piston 14 occupying a position corresponding to the position of the fulcrum 45. Now, if the fulcrum 45 is lowered, the valve land 21 will be moved correspondingly, and fluid from the supply line 19 will flow into the passage 42 and the servo cylinder 16 each time the slot 36 comes into registry simultaneously with the hole 32 and the port 37. The resulting downward motion of the servo piston 14 is imparted to the lever 44 which swings about the fulcrum 45 and raises the valve land. By virtue of this follow-up action, the valve 20 becomes closed when the servo piston reaches a position corresponding to the new position of the fulcrum point 45. In the motion of the servo piston to its new position, the speeder spring is compressed and the speed setting of the governor, and, therefore, the speed of the controlled prime mover are increased correspondingly. The rate of this speed increase is, it will be observed, limited by the flow of fluid to the servo cylinder which takes place intermittently and, therefore, at an average rate determined by the selected adjustment of the bushing 30.

Speed decreasing adjustment of the servo 15 takes place when the position of the fulcrum 45 is raised to open the valve 20 and allow fluid from the servo cylinder to escape to the drain through the lower end of the sleeve 24. In this case, however, the intermittently opened valve is by-passed so that the rate of decrease in the speed adjustment is not limited.

This application is a division of my copending application Serial No. 591,809, filed May 3, 1945, now Patent No. 2,496,284.

I claim as my invention:

1. The combination of a servo energized by the flow of pressure fluid thereto comprising means defining a bore, a sleeve continuously rotating in said bore, a plunger slidable in said sleeve and cooperating with a port in the sleeve to form a valve, and means providing a fluid supply passage leading to said servo through said valve and including ports in said bore and said rotating sleeve adapted to register during part of each revolution of the sleeve and to remain out of register during the remainder of the revolution.

2. The combination of a servo energized by the flow of pressure fluid thereto comprising means defining a bore, a plunger slidable in said bore and cooperating with a port in the bore to form a valve, and means providing a fluid supply passage leading to said servo through said valve and including two parts continuously rotated relative to each other and having ports which register during part of each revolution to permit of fluid flow through said passage and which remain out of register and thereby interrupt the fluid flow during the remainder of the revolution.

3. The combination of, means defining a bore, a sleeve rotatable in said bore, a plunger slidable in said sleeve and cooperating with a port therein to form a valve which is opened and closed by shifting said plunger and sleeve relative to each other axially, and means providing a fluid passage leading into said sleeve at one end of said plunger including ports in said bore and sleeve adapted to register with each other during part of each revolution of the sleeve and to remain out of register during the remainder of the revolution.

4. The combination of, means defining a bore, a sleeve rotatable in said bore, a plunger slidable in said sleeve and cooperating with a port therein to form a valve which is opened and closed by shifting said plunger and sleeve relative to each other axially, means providing a fluid passage leading into said sleeve at one end of said plunger including ports in said bore and sleeve adapted to register with each other during part of each revolution of the sleeve and to remain out of register during the remainder of the revolution, and a bushing surrounding said sleeve and one of said ports and angularly adjustable to vary the effective area of such port.

5. A valve for controlling the flow of fluid under pressure comprising means defining a cylindrical bore having a first and second port opening therein and spaced apart axially of the bore, a cylindrical bushing projecting into one end of said bore across said first port and having a hole therethrough registering with and smaller than the first port, means for holding said bushing in different positions of angular adjustment, and a rotary shaft journaled in said bushing and said bore and having a recess adapted to register with both said hole and said second port during part of each revolution of the shaft, said shaft closing said hole and said second port during the remainder of the revolution.

SIDNEY LOCKWOOD GILLESPIE.

REFERENCES CITED

The following references are of record in the file of this patent:

UNITED STATES PATENTS

| Number | Name | Date |
|---|---|---|
| 1,968,390 | Hamilton | July 31, 1934 |
| 2,397,213 | Smith | Mar. 26, 1946 |